(12) United States Patent
Yamamoto

(10) Patent No.: US 11,937,284 B2
(45) Date of Patent: Mar. 19, 2024

(54) BASE STATION CONTROL APPARATUS, BASE STATION CONTROL METHOD, AND STORAGE MEDIUM

(71) Applicant: CANON KABUSHIKI KAISHA, Tokyo (JP)

(72) Inventor: Tetsuya Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 17/463,329

(22) Filed: Aug. 31, 2021

(65) Prior Publication Data

US 2022/0070875 A1 Mar. 3, 2022

(30) Foreign Application Priority Data

Sep. 2, 2020 (JP) ................................. 2020-147637

(51) Int. Cl.
*H04L 12/28* (2006.01)
*H04W 16/14* (2009.01)
*H04W 72/0453* (2023.01)
*H04W 72/541* (2023.01)
*H04J 1/16* (2006.01)

(52) U.S. Cl.
CPC ......... *H04W 72/541* (2023.01); *H04W 16/14* (2013.01); *H04W 72/0453* (2013.01)

(58) Field of Classification Search
CPC ............. H04W 16/14; H04W 72/0453; H04W 72/541
USPC ........................................ 370/252, 329, 430
See application file for complete search history.

(56) References Cited

U.S. PATENT DOCUMENTS

| | | | |
|---|---|---|---|
| 2017/0019899 A1* | 1/2017 | Yang ..................... | H04W 16/14 |
| 2017/0201998 A1 | 7/2017 | Akiyama et al. | |
| 2020/0267758 A1* | 8/2020 | Li .......................... | H04W 24/02 |
| 2022/0400386 A1* | 12/2022 | Furuichi ............. | H04W 56/001 |

FOREIGN PATENT DOCUMENTS

JP 6418244 B2 11/2018

\* cited by examiner

*Primary Examiner* — John Pezzlo
(74) *Attorney, Agent, or Firm* — Canon U.S.A., Inc. IP Division

(57) ABSTRACT

A communication control apparatus includes an acquisition unit configured to acquire radio-frequency-interference-related information related to radio frequency interference of a frequency band in a licensed band, based on an operation status of the frequency band in the licensed band, and a management unit configured to manage a frequency band to be used in operation, based on the radio-frequency-interference-related information acquired by the acquisition unit.

20 Claims, 9 Drawing Sheets

FIG.1
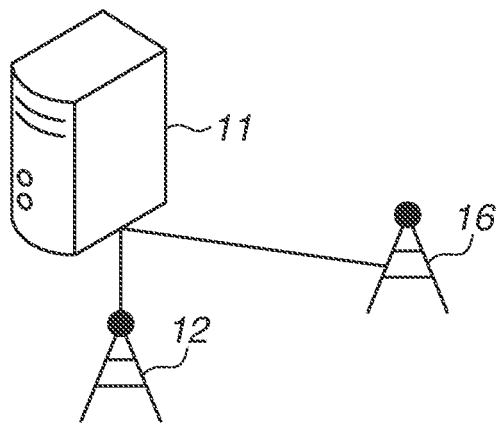
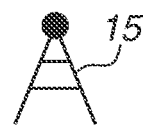
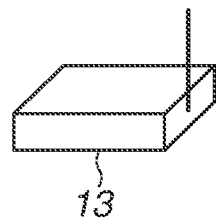
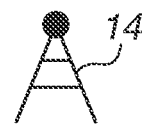

FIG.5

| REPORT TERMINAL ID | BASE STATION ID | BASE STATION FREQUENCY | BASE STATION RSSI |
|---|---|---|---|
| 103 | 102 (CONNECTED) | 4650 MHz | -80 dBm |
| 103 | 104 | 4750 MHz | -85 dBm |
| 103 | 105 | 4650 MHz | -75 dBm |
| 103 | 106 | 4750 MHz | -95 dBm |

FIG.6

| BASE STATION ID OF OWN LOCAL 5G COMMUNICATION NETWORK |
|---|
| 102 |
| 106 |

FIG.7

| REPORT TERMINAL ID | BASE STATION ID | BASE STATION FREQUENCY | BASE STATION RSSI |
|---|---|---|---|
| 103 | 102 | 4650 MHz | -80 dBm |
| 103 | 104 | 4750 MHz | -85 dBm |
| 103 | 105 | 4650 MHz | -90 dBm |
| 103 | 106 | 4750 MHz | -95 dBm |

BASE STATION CONTROL APPARATUS, BASE STATION CONTROL METHOD, AND STORAGE MEDIUM

BACKGROUND

Field

The present disclosure relates to a communication control apparatus, a communication control method, and a storage medium.

Description of the Related Art

There is known a technique for operating a communication system based on a 3rd Generation Partnership Project (3GPP) specification, using an unlicensed band not requiring a license granted by the authorities of each country (Japanese Patent No. 6418244).

In using this unlicensed band, carrier sensing for confirming that the same frequency is not used by other wireless devices can be requested before transmission, in order to coexist with other communication systems.

Meanwhile, it has been studied to build a communication system based on a 3GPP specification as a private network only in a limited area such as a property of a landowner, using a licensed band requiring a license granted by the authorities of each country. This private network is referred to as a private Long Term Evolution (LTE) network or a local 5th Generation (5G) network, depending on a 3GPP technology to be used.

As for a licensed band for public wireless network, a frequency band is allocated to each public wireless network operator. Therefore, interference in the same licensed band is usually caused by another base station of the operator, and the operator can address interference between networks.

In the local 5G network described above, in a case where the owner of an adjacent land, not a public wireless network operator, has a license to use the same licensed band, if interference between networks occurs, it is difficult to resolve the interference by oneself. So communication quality can deteriorate due to the interference between networks.

If the local 5G network is operated using an unlicensed band to avoid the interference between networks, carrier sensing is desirable, and in this case, a delay time based on a request for the carrier sensing occurs.

SUMMARY

Various embodiments of the present disclosure are directed to reducing interference between networks while suppressing an increase in delay time.

According to various embodiments of the present disclosure, a communication control apparatus includes an acquisition unit configured to acquire radio-frequency-interference-related information related to radio frequency interference of a frequency band in a licensed band, based on an operation status of the frequency band in the licensed band, and a management unit configured to manage a frequency band to be used in operation, based on the radio-frequency-interference-related information acquired by the acquisition unit.

Further features of various embodiments of the present disclosure will become apparent from the following description of exemplary embodiments with reference to the attached drawings.

BRIEF DESCRIPTION OF THE DRAWINGS

FIG. 1 is a diagram illustrating an example of a network configuration according to a first exemplary embodiment.

FIG. 5 is a diagram illustrating an example of radio-frequency-interference-related information at the time of operation using a licensed band.

FIG. 6 is a diagram illustrating an example of a base station identification (ID) list according to the first exemplary embodiment.

FIG. 7 is a diagram illustrating an example of radio-frequency-interference-related information at the time of operation using an unlicensed band.

DESCRIPTION OF THE EMBODIMENTS

Figure 2:
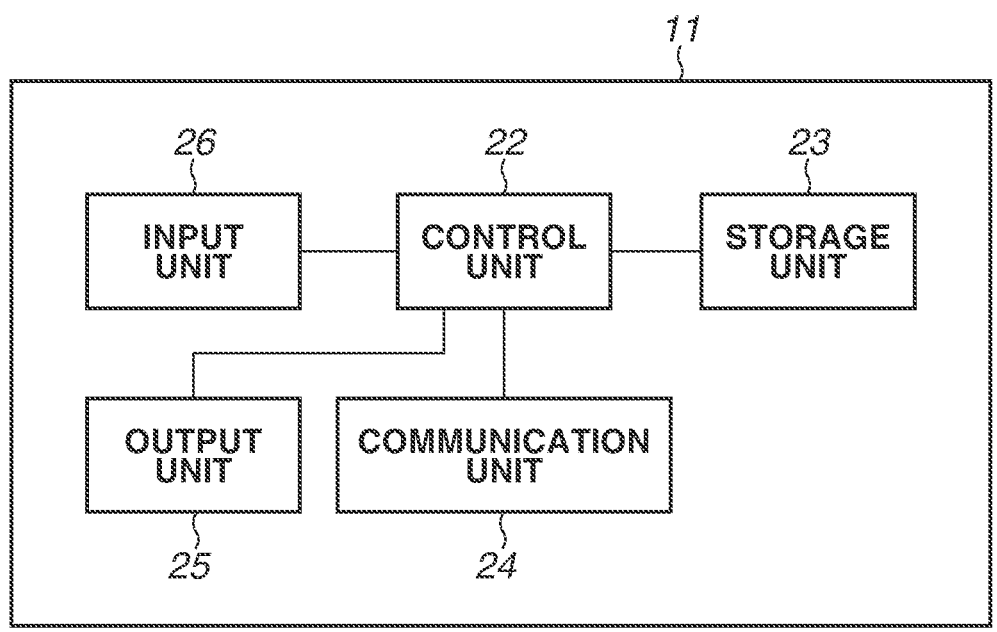
FIG. 2 is a block diagram illustrating an example of a hardware configuration of a communication control apparatus according to the first exemplary embodiment.

Exemplary embodiments of the present disclosure will be described in detail below with reference to the attached drawings. The following exemplary embodiments are not intended to limit the scope of the present invention, and not all of the combinations of features described in the exemplary embodiments are necessarily required for a solution of the present invention. The configurations of the exemplary embodiments can be appropriately modified or changed depending on specifications and various conditions (such as a use condition and a usage environment) of apparatuses to which the present invention is applied. The technical scope of the present invention is determined by claims, and is not limited by the following individual exemplary embodiments.

A first exemplary embodiment will be described. FIG. 1 is a diagram illustrating an example of a network configuration according to the first exemplary embodiment.

In FIG. 1, a communication system based on a 3rd Generation Partnership Project (3GPP) specification is built in this network. This network can include a private network built only in a limited area such as a land of a landowner, using a licensed band requiring a license granted by the authorities of each country. This private network can be a local 5th Generation (5G) network that can be operated using an unlicensed band in response to interference between networks.

The licensed band is intended to be licensed to only a specific public wireless network operator and designed to prevent occurrence of interference between networks, and therefore, carrier sensing is not essential.

On the other hand, an unspecified number of communication apparatuses use the unlicensed band and interference between networks can occur, and therefore, carrier sensing may be desirable.

This communication system includes a communication control apparatus 11 and a terminal 13. The communication control apparatus 11 controls own local 5G communication. The communication control apparatus 11 is connected to base stations 12 and 16 of the own local 5G communication network. The terminal 13 is a local 5G terminal. The terminal 13 can scan base stations varying in frequency band/radio access technology (RAT), for a handover (an intra-RAT or inter-RAT handover). The terminal 13 can find neighbor cells by scanning all physical cell identifications (PCIs). A base station notifies the terminal 13 of a frequency to be searched, in order to find neighbors that use other frequencies.

The base station 16 does not connect to the terminal 13, but this is a base station of the own local 5G network and the terminal 13 can detect a notification signal from the base station 16. Base stations 14 and 15 are base stations (also referred to as the adjacent base stations) of a local 5G communication network adjacent to the own local 5G communication network. The base stations 14 and 15 are the sources of interference with the own local 5G communication network.

The communication control apparatus 11 acquires radio-frequency-interference-related information of a frequency band in the licensed band, based on an operation status of the frequency band in the licensed band. The radio-frequency-interference-related information is information related to radio frequency interference of the frequency band in the licensed band. Further, the communication control apparatus 11 manages a frequency band to be used in the operation of the private network, based on the acquired radio-frequency-interference-related information.

For example, in a case where the network is operated using the unlicensed band in order to avoid interference occurring in the licensed band, the communication control apparatus 11 acquires the radio-frequency-interference-related information of the licensed band. In a case where the radio frequency interference in the licensed band has dissolved, the communication control apparatus 11 changes the frequency band to be used in operating the private network to the licensed band, and in a case where the interference has not dissolved, the communication control apparatus 11 continues to use the unlicensed band.

Further, in a case where the network is operated using the licensed band, the communication control apparatus 11 acquires the radio-frequency-interference-related information of the licensed band. In a case where there is radio frequency interference in the licensed band, the communication control apparatus 11 changes the frequency band to be used in operating the private network to the unlicensed band, and in a case where there is no interference, the communication control apparatus 11 continues to use the licensed band.

Whether the network is to be operated using the licensed band or the unlicensed band can be thereby determined based on the interference state of the frequency band in the licensed band. At this time, even in a case where the local 5G communication is performed using the unlicensed band to avoid interference occurring in the licensed band, the network can be restored to the licensed band when the interference occurring in the licensed band dissolves. Therefore, for example, in a case where the landowner of an adjacent land is given a license to use the same licensed band, it is possible to reduce interference between networks while suppressing an increase in communication delay time even when interference between networks occurs at a place such as the boundary of the land.

FIG. 2 is a block diagram illustrating an example of a hardware configuration of the communication control apparatus 11 according to the first exemplary embodiment.

In FIG. 2, the communication control apparatus 11 includes a control unit 22, a storage unit 23, a communication unit 24, an output unit 25, and an input unit 26.

The control unit 22 controls the entire communication control apparatus 11 by executing a control program stored in the storage unit 23. The control unit 22 may include a processor. The processor may be a central processing unit (CPU), or may be a graphics processing unit (GPU). The processor may be a single core processor, or may be a multi-core processor. The processor may operate as a neural network.

Figure 4:
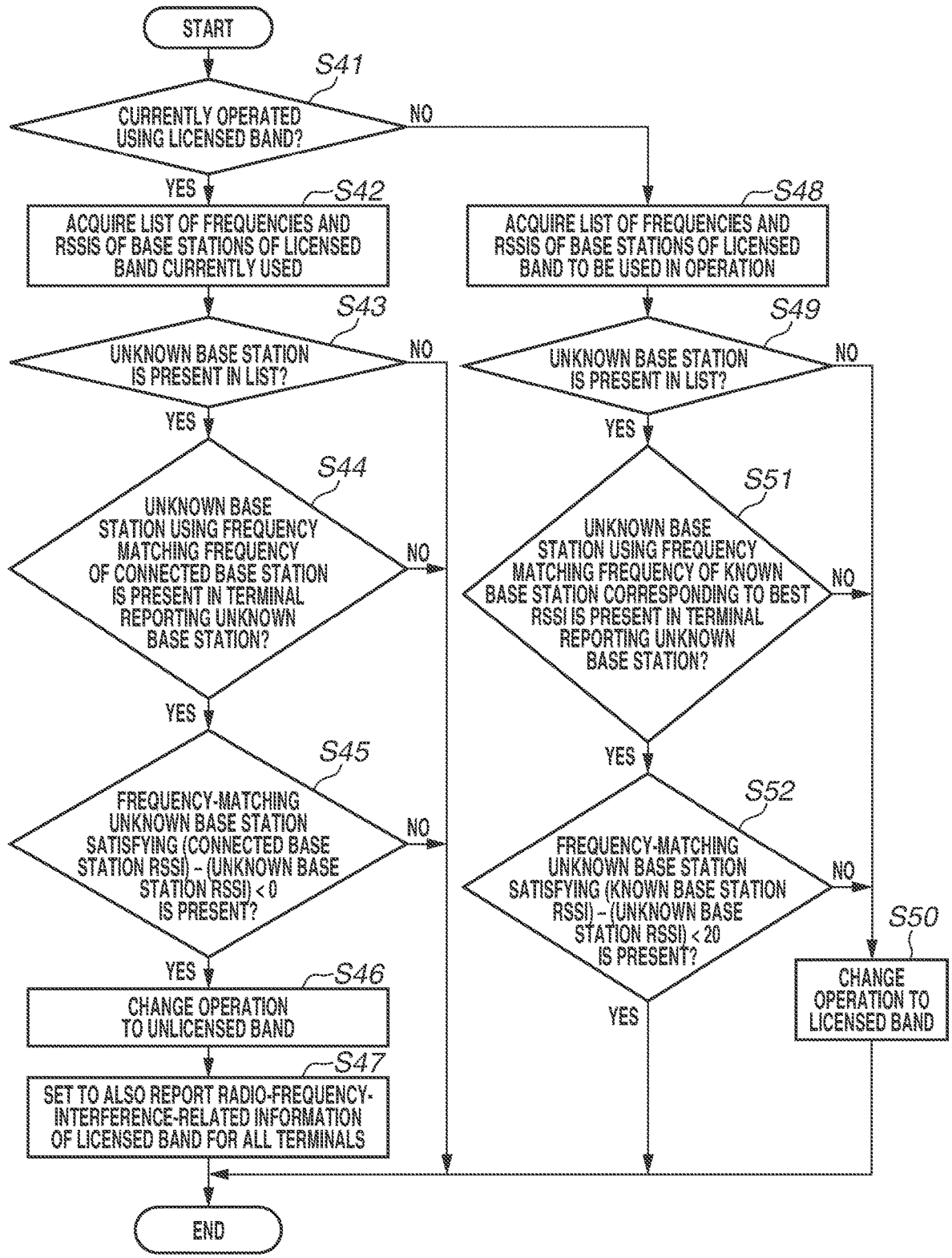
FIG. 4 is a flowchart illustrating licensed band operation processing according to the first exemplary embodiment.
Figure 8:
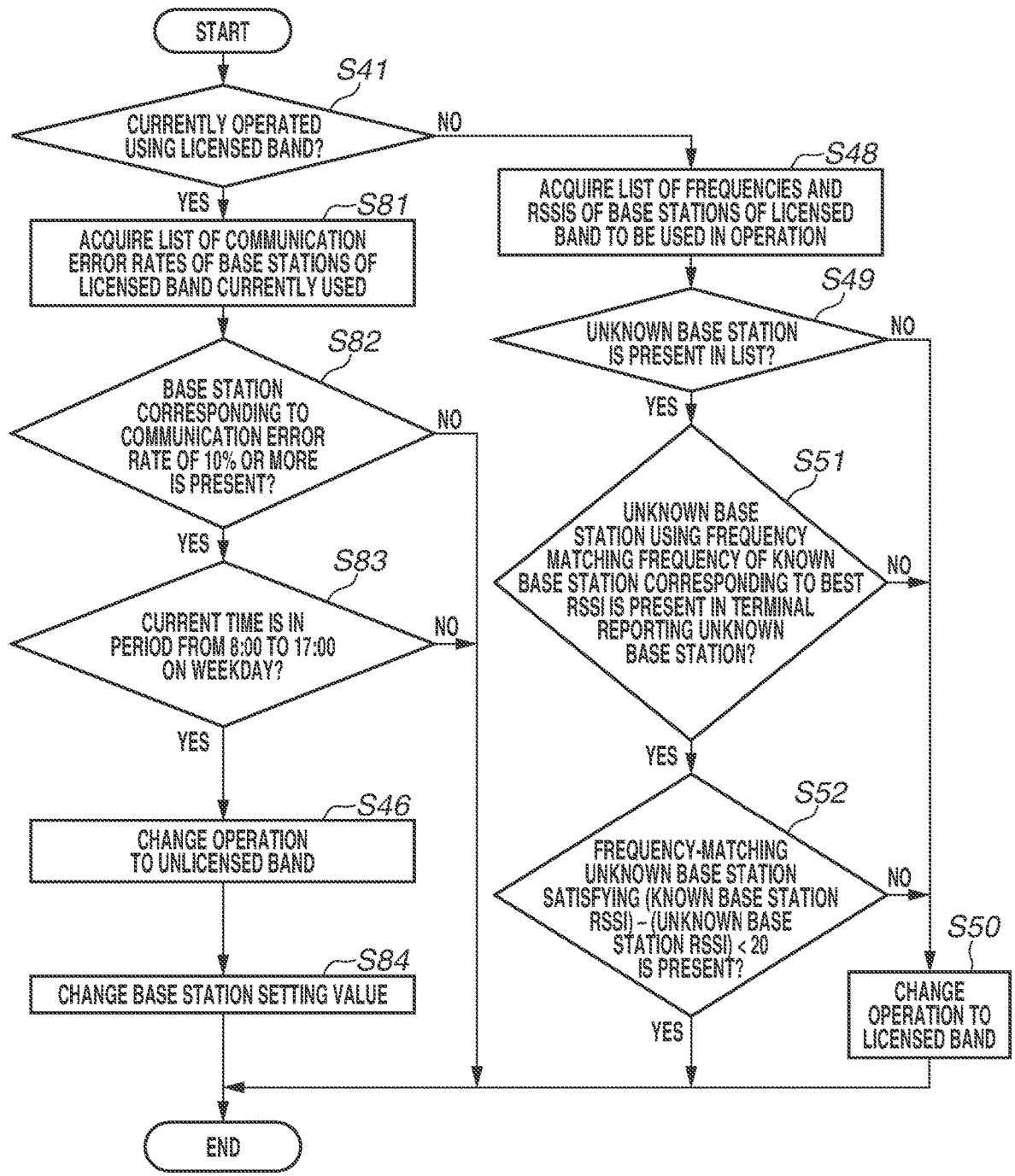
FIG. 8 is a flowchart illustrating licensed band operation processing according to a second exemplary embodiment.
Figure 9:
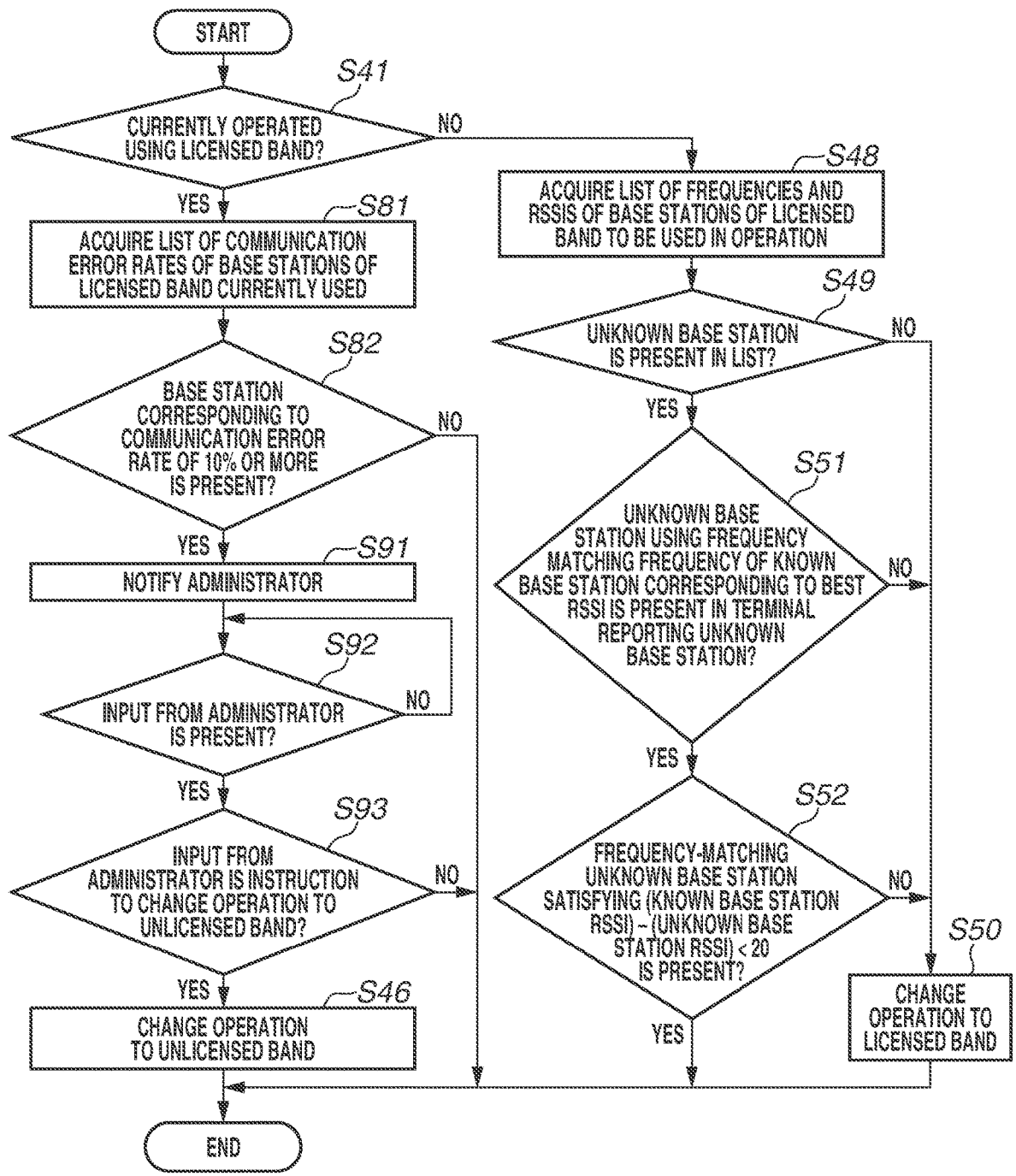
FIG. 9 is a flowchart illustrating licensed band operation processing according to a third exemplary embodiment.

The storage unit 23 stores the control program to be executed by the control unit 22, and various kinds of information such as communication parameters and data. The storage unit 23 can be configured using a semiconductor memory such as a static random access memory (SRAM) or a dynamic random access memory (DRAM). The storage unit 23 may include an auxiliary memory such as a hard disk drive or a solid state drive (SSD). The control unit 22 executes the control program stored in the storage unit 23, so that licensed band operation processing in any of FIG. 4, FIG. 8, and FIG. 9 is performed.

The communication unit 24 communicates with the base station 12. The output unit 25 performs various kinds of display. The output unit 25 may output information that can be visually recognized, or may output sound. Examples of the output unit 25 include a screen display device (such as a liquid crystal display (LCD) monitor, an organic electroluminescence (EL) display, and a graphics card), a voice output device (such as a speaker), and a printer. The input unit 26 receives various inputs from a user. Examples of the input unit 26 include a keyboard, a mouse, a touch panel, a card reader, and a voice input device.

Figure 3:
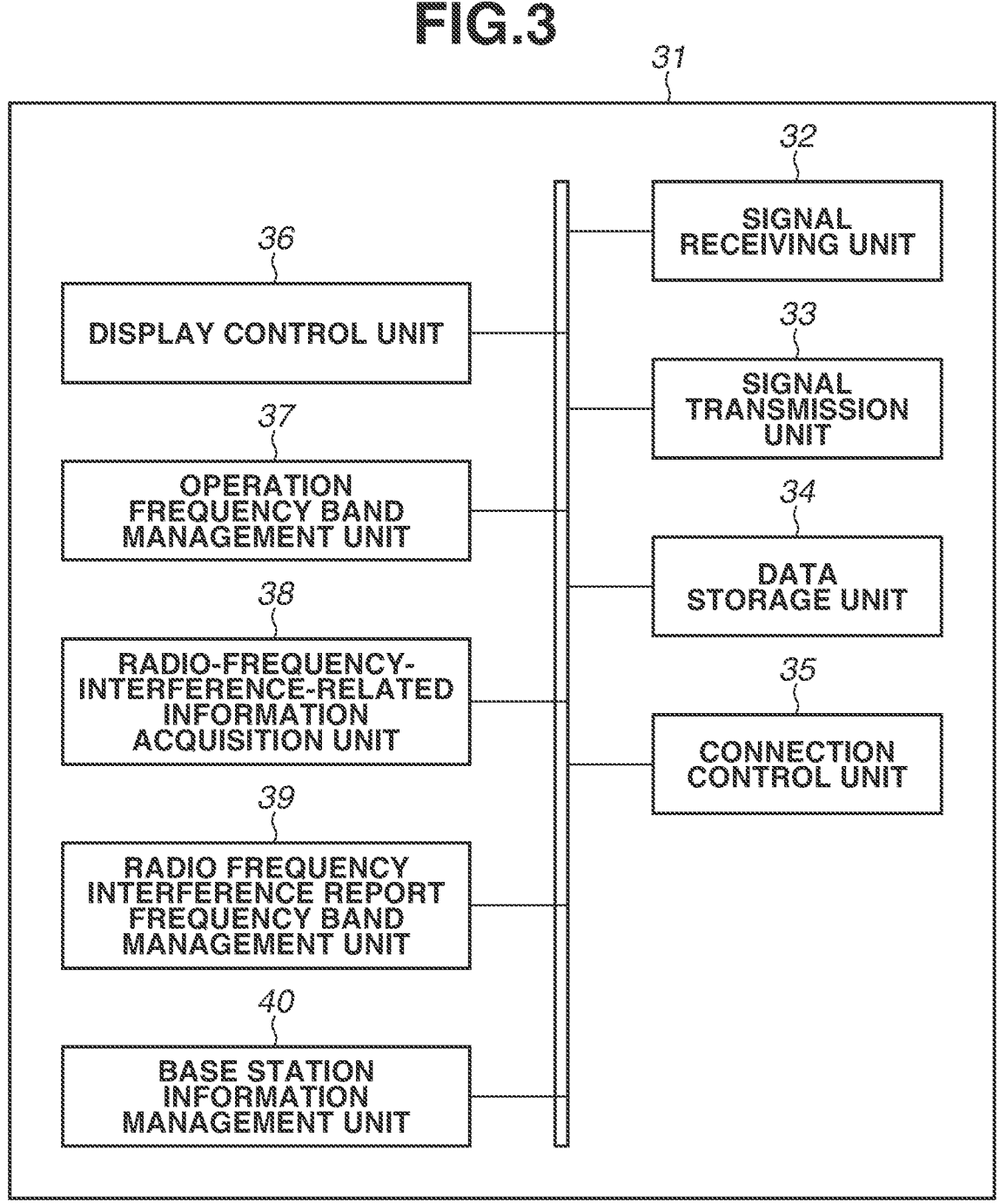
FIG. 3 is a block diagram illustrating an example of a functional configuration of the communication control apparatus according to the first exemplary embodiment.

FIG. 3 is a block diagram illustrating an example of a functional configuration of the communication control apparatus 11 according to the first exemplary embodiment.

Functions of some of functional blocks illustrated in FIG. 3 are implemented by software, and a program for providing each of such functions is stored in a memory such as a read only memory (ROM). This program is read out into a random access memory (RAM) and executed by a processor.

For functions to be implemented by hardware, a dedicated circuit may be automatically generated on a field programmable gate array (FPGA) from a program for implementing each of such functions, by using a predetermined compiler. Further, a gate array circuit may be formed in a manner similar to the FPGA and implemented as the hardware. Furthermore, each of such functions may be implemented by an application specific integrated circuit (ASIC). The configuration of the functional blocks illustrated in FIG. 3 is an example, and a plurality of functional blocks may form one functional block, or any of the functional blocks may be divided into a plurality of functional blocks.

In FIG. 3, a communication control unit 31 includes a signal receiving unit 32, a signal transmission unit 33, a data storage unit 34, a connection control unit 35, and a display control unit 36. The communication control unit 31 further includes an operation frequency band management unit 37, a radio-frequency-interference-related information acquisition unit 38, a radio frequency interference report frequency band management unit 39, and a base station information management unit 40.

The signal receiving unit 32 and the signal transmission unit 33 perform the local 5G communication conforming to the 3GPP standard with the base station 12 of the local 5G communication network.

The data storage unit 34 stores software and information such as authentication information.

The connection control unit 35 performs processing for connection with the base station 12 of the local 5G communication network.

The display control unit 36 performs control processing for a screen or the like to be displayed on the output unit 25.

The operation frequency band management unit 37 manages an operation frequency band of the local 5G communication network. The operation frequency band management unit 37 can manage a frequency band to be used in the operation, based on the radio-frequency-interference-related information related to radio frequency interference of the frequency band in the licensed band.

For example, the operation frequency band management unit 37 can determine an interference state of interference between a frequency band being used in operation in the unlicensed band and the frequency band in the licensed band, based on the radio-frequency-interference-related information of the frequency band in the licensed band. The operation frequency band management unit 37 can subsequently change the frequency band being used in operation in the unlicensed band to the frequency band in the licensed band, based on the result of determining the interference state.

Further, the operation frequency band management unit 37 can determine an interference state of interference between the frequency band being used in operation in the licensed band and the frequency band in the licensed band, based on the radio-frequency-interference-related information of the frequency band in the licensed band. The operation frequency band management unit 37 can change the frequency band being used in operation in the licensed band to the frequency band in the unlicensed band, based on the result of determining the interference state.

The radio-frequency-interference-related information acquisition unit 38 acquires the radio-frequency-interference-related information reported by the local 5G terminal or the like. The radio-frequency-interference-related information is, for example, information such as a frequency and a received signal strength indicator (RSSI) of a base station. The radio-frequency-interference-related information may be a communication error rate of the base station.

The radio frequency interference report frequency band management unit 39 manages a frequency band to be reported, for the radio-frequency-interference-related information to be reported by the local 5G terminal or the like.

The base station information management unit 40 manages base station information such as a base station identification (ID) and a communication frequency of a base station of the own local 5G communication network. In the present exemplary embodiment, the number of the base stations illustrated in FIG. 1 is two that is a minimum number desirable for the description, but a plurality of base stations of the own local 5G communication network may be further present. In this case, the base station information management unit 40 manages the base station information of those plurality of base stations.

FIG. 4 is a flowchart illustrating licensed band operation processing according to the first exemplary embodiment.

The control unit 22 reads out a program stored in the storage unit 23 and executes the read-out program, so that each step in FIG. 4 is implemented. At least a part of the flowchart illustrated in FIG. 4 may be implemented by hardware. In a case where a part of the flowchart is implemented by hardware, a dedicated circuit may be automatically generated on an FPGA from the program for implementing each step, by using a predetermined compiler. Further, a gate array circuit may be formed in a manner similar to the FPGA and implemented as the hardware. Furthermore, each step may be implemented by an ASIC.

In this case, each block in the flowchart illustrated in FIG. 4 can be regarded as a hardware block. A plurality of blocks may be collectively configured as one hardware block, or one block may be configured as a plurality of hardware blocks.

The control unit 22 regularly starts the processing in FIG. 4, after the operation of the local 5G communication network begins.

First, in step S41, the operation frequency band management unit 37 determines whether the local 5G communication network is currently operated using the licensed band. In this determination, the information of the operation frequency band managed by the operation frequency band management unit 37 is used. In the present exemplary embodiment, as the operation frequency band, the 4.6 GHz band is used in the case of the licensed band, and the 5.6 GHz band is used in the case of the unlicensed band. Therefore, the operation frequency band management unit 37 can determine that the licensed band is used in a case where the local 5G communication network is operated using the 4.6 GHz band, and can determine that the unlicensed band is used in a case where the local 5G communication network is operated using the 5.6 GHz band.

If the local 5G communication network is currently operated using the licensed band (YES in step S41), the processing proceeds to step S42. In step S42, the radio-frequency-interference-related information acquisition unit 38 acquires a list of frequencies and RSSIs of the base stations of the licensed band currently used in the operation, as the radio-frequency-interference-related information. In this acquisition, a neighboring base station information reporting function of the terminal 13 conforming to the 3GPP specification can be used. In this process, the radio-frequency-interference-related information acquisition unit 38 acquires the frequency and RSSI information for each neighboring base station ID reported by the terminal 13, via the base station 12.

FIG. 5 is a diagram illustrating an example of the radio-frequency-interference-related information at the time of the operation using the licensed band. In FIG. 5, the frequency and RSSI information is illustrated as the radio-frequency-interference-related information at the time of the operation using the licensed band.

In FIG. 5, the radio-frequency-interference-related information includes entries of a report terminal ID, a base station ID, a base station frequency, and a base station RSSI. The report terminal ID identifies a terminal that has reported the frequency and RSSI information. For example, the terminal 13 in FIG. 1 is assigned a report terminal ID 103. The base station ID indicates an ID for identifying a base station. The base station ID includes information indicating the presence or absence of a base station being connected (also referred to as the connected base station). For example, the base stations 12, 14, 15, and 16 in FIG. 1 are assigned base station IDs 102, 104, 105, and 106, respectively. The base station frequency indicates the communication frequency of a radio wave used in the base station. The base station RSSI indicates the RSSI of the base station.

In the present exemplary embodiment, the number of the terminals 13 is one, which is a minimum number desirable for the description, but the number of the terminals of the own local 5G communication network may be two or more. In this case, the radio-frequency-interference-related information acquisition unit 38 acquires information reported by those terminals, via the base station of the own local 5G communication network to which those terminals are connected.

Next, in step S43, the operation frequency band management unit 37 determines whether an unknown base station not included in the own network (also referred to as the unknown base station) is present in the list of frequencies and RSSIs acquired in step S42. In this determination, a base station ID list of the own local 5G communication network managed by the base station information management unit 40 is used.

FIG. 6 is a diagram illustrating an example of the base station ID list according to the first exemplary embodiment.

In FIG. 6, the base station ID list indicates an ID for identifying the base station of the own local 5G communication network. In the present exemplary embodiment, the number of the base stations is two, which is a minimum number desirable for the description, and thus the number of entries in the ID list in FIG. 6 is two, but the number of the base stations of the own local 5G communication network may be three or more. In this case, the number of items in the base station ID list is also three or more.

The operation frequency band management unit 37 can determine whether the unknown base station not included in the own network is present, by comparing the contents of the base station ID list in FIG. 6 and the base station IDs in FIG. 5. For example, the base station ID list in FIG. 6 does not include the base station IDs 104 and 105, whereas the radio-frequency-interference-related information in FIG. 5 includes the base station IDs 104 and 105. Therefore, the operation frequency band management unit 37 can determine that the base stations 14 and 15 assigned the base station IDs 104 and 105 are the unknown base stations.

If an unknown base station not included in the own network is present in the list of frequencies and RSSIs (NO in step S43), the processing ends, and the operation frequency band management unit 37 continues the operation using the licensed band.

If an unknown base station not included in the own network is present in the list of frequencies and RSSIs (YES in step S43), the processing proceeds to step S44. In step S44, the operation frequency band management unit 37 determines whether an unknown base station that uses a frequency matching the frequency of the connected base station is present in the terminal reporting the unknown base station. For example, as illustrated in FIG. 5, the frequency of the connected base station 12 is 4650 MHz. Meanwhile, the frequency of the unknown base station 14 is 4750M Hz. Therefore, the operation frequency band management unit 37 can determine that the frequency of the unknown base station 14 does not match the frequency of the base station 12. Further, the frequency of the unknown base station 15 is 4650 MHz. Therefore, the operation frequency band management unit 37 can determine that the frequency of the unknown base station 15 matches the frequency of the connected base station 12.

If an unknown base station that uses a frequency matching the frequency of the connected base station is not present (NO in step S44), the processing ends, and the operation frequency band management unit 37 continues the operation using the licensed band.

If an unknown base station that uses a frequency matching the frequency of the connected base station is present (YES in step S44), the processing proceeds to step S45. In step S45, the operation frequency band management unit 37 determines whether a frequency-matching unknown base station that satisfies (connected base station RSSI)−(unknown base station RSSI)<0 is present. For example, as illustrated in FIG. 5, the RSSI of the connected base station 12 is −80 dBm. The RSSI of the unknown frequency matching base station 15 is −75 dBm. Therefore, the operation frequency band management unit 37 can determine that (connected base station RSSI)−(unknown base station RSSI) =−80−(−75)=−5<0.

If a frequency-matching unknown base station that satisfies (connected base station RSSI)−(unknown base station RSSI)<0 is not present (NO in step S45), the processing ends, and the operation frequency band management unit 37 continues the operation using the licensed band.

If a frequency-matching unknown base station that satisfies (connected base station RSSI)−(unknown base station RSSI)<0 is present (YES in step S45), the processing proceeds to step S46. In step S46, the operation frequency band management unit 37 changes the operation from the licensed band to the unlicensed band.

Next, in step S47, the radio frequency interference report frequency band management unit 39 sets to report the radio-frequency-interference-related information of not only the unlicensed band to which the operation is changed, but also the licensed band, for all terminals in the own local 5G communication network.

If the own local 5G communication network is not currently operated using the licensed band (NO in step S41), the processing proceeds to step S48. In step S48, the radio-frequency-interference-related information acquisition unit 38 acquires a list of frequencies and RSSIs of the base stations of the licensed band to be used in the operation.

In this acquisition, the neighboring base station information reporting function of the terminal 13 conforming to the 3GPP specification is used, as with step S42.

The base station to which the terminal 13 is connected at this moment is a base station (not illustrated) operated using the unlicensed band. In a case where the result of step S41 is NO, the local 5G communication network is currently operated using the unlicensed band, but in such a case as well, the processing in step S48 is enabled because the radio-frequency-interference-related information of the licensed band is set to be also reported in step S47. The radio-frequency-interference-related information acquisition unit 38 in the communication control unit 31 acquires the frequency and RSSI information for each neighboring base station ID reported by the terminal 13, via the base station (not illustrated) operated using the unlicensed band.

FIG. 7 is a diagram illustrating an example of the radio-frequency-interference-related information at the time of the operation using the unlicensed band. In FIG. 7, the frequency and RSSI information is illustrated as the radio-frequency-interference-related information at the time of the operation using the unlicensed band.

In FIG. 7, the radio-frequency-interference-related information includes entries of a report terminal ID, a base station ID, a base station frequency, and a base station RSSI. The report terminal ID identifies a terminal that has reported the frequency and RSSI information. The base station ID indicates an ID for identifying a base station. The base station frequency indicates the communication frequency of a radio wave used in the base station. The base station RSSI indicates the RSSI of the base station.

Next, in step S49, the operation frequency band management unit 37 determines whether an unknown base station not included in the own network (also referred to as the unknown base station) is present in the list of frequencies and RSSIs acquired in step S48. In this determination, the list of frequencies and RSSIs in FIG. 7 and the base station ID list of the own local 5G communication network in FIG. 6 are used.

The operation frequency band management unit 37 can determine whether an unknown base station not included in the own network is present, by comparing the contents of the base station ID list in FIG. 6 and the base station IDs in FIG. 7. For example, the base station ID list in FIG. 6 does not include the base station IDs 104 and 105, whereas the list of frequencies and RSSIs in FIG. 7 includes the base station IDs 104 and 105. Therefore, the operation frequency band management unit 37 can determine that the base stations 14 and 15 assigned the base station IDs 104 and 105 are the unknown base stations.

If an unknown base station not included in the own network is not present in the list of frequencies and RSSIs (NO in step 49), the processing proceeds to step S50. In step S50, the operation frequency band management unit 37 changes the operation from the unlicensed band to the licensed band.

If an unknown base station not included in the own network is present in the list of frequencies and RSSIs (YES in step S49). The processing proceeds to step S51. In step S51, the operation frequency band management unit 37 determines whether an unknown base station that uses a frequency matching the frequency of a known base station having the best RSSI is present in the terminal reporting the unknown base station.

To find the known base station having the best RSSI, the list of frequencies and RSSIs in FIG. 7 and the base station ID list of the own local 5G communication network in FIG. 6 are used. Specifically, the operation frequency band management unit 37 can detect the known base stations present in the own network, by comparing the contents of the base station ID list in FIG. 6 and the base station IDs in FIG. 7. Subsequently, the operation frequency band management unit 37 can find the known base station having the best RSSI, by comparing the base station RSSIs in the list in FIG. 7 corresponding to the detected known base stations in the own network.

For example, the base station IDs 102 and 106 are included in the base station ID list of the own local 5G communication network in FIG. 6 and also included in the list of the base station IDs in FIG. 7. Therefore, the operation frequency band management unit 37 can detect the base stations 12 and 16 assigned the base station IDs 102 and 106, as the known base stations. Subsequently, referring to the list in FIG. 7, the operation frequency band management unit 37 compares the RSSIs of the base stations 12 and 16 assigned the base station IDs 102 and 106. The operation frequency band management unit 37 can thereby find the base station 12 assigned the base station ID 102, as the known base station having the best RSSI. Further, as illustrated in FIG. 7, the frequency of the known base station 12 is 4650 MHz. Furthermore, the frequencies of the unknown base stations 14 and 15 are 4750M Hz and 4650 MHz, respectively. Therefore, the operation frequency band management unit 37 can determine that the frequency of the unknown base station 14 does not match the frequency of the known base station 12 and the frequency of the unknown base station 15 matches the frequency of the known base station 12.

If an unknown base station that uses a frequency matching the frequency of a known base station having the best RSSI is not present in the terminal reporting the unknown base station (NO in step S51), the processing proceeds to step S50. In step S50, the operation frequency band management unit 37 changes the operation from the unlicensed band to the licensed band.

If an unknown base station that uses a frequency matching the frequency of a known base station having the best RSSI is present in the terminal reporting the unknown base station (YES in step S51), the processing proceeds to step S52. In step S52, the operation frequency band management unit 37 determines whether a frequency-matching unknown base station that satisfies (known base station RSSI)−(unknown base station RSSI)<20 is present.

For example, as illustrated in FIG. 7, the RSSI of the known base station 12 is −80 dBm. The RSSI of the base station 15 that is the unknown frequency matching base station is −90 dBm. Therefore, (known base station RSSI)−(unknown base station RSSI)=−80−(−90)=10<20 is determined.

If a frequency-matching unknown base station that satisfies (known base station RSSI)−(unknown base station RSSI)<20 is not present (NO in step S52), the processing proceeds to step S50. In step S50, the operation frequency band management unit 37 changes the operation from the unlicensed band to the licensed band. The operation frequency band management unit 37 can thereby change the operation from the unlicensed band to the licensed band, only in a case where the RSSI of the known base station is sufficiently greater than the RSSI of the unknown frequency matching base station, specifically, by 20 dB or more. Therefore, the interference between networks can be suppressed also in a case where the operation is changed from the unlicensed band to the licensed band.

If a frequency-matching unknown base station that satisfies (known base station RSSI)−(unknown base station RSSI)<20 is present (YES in step S52), the processing ends, and the operation using the unlicensed band continues.

As described above, according to the first exemplary embodiment, the network can be quickly returned from the unlicensed band to the licensed band in a case where the interference between networks decreases or dissolves, so that an increase in delay time caused in the operation using the unlicensed band can be suppressed. Moreover, the network can be quickly shifted from the licensed band to the unlicensed band in a case where the interference between networks occurs or increases, so that a deterioration in packet error rate caused by the interference between networks can be suppressed.

In the flowchart in FIG. 4, 0 is used as a predetermined value on the right side of the conditional expression in step S45, and 20 is used as a predetermined value on the right side of the conditional expression in step S52. The present exemplary embodiment is not necessarily limited to these predetermined values and may adopt predetermined values most suitable for the local 5G communication network to be operated.

Further, in the exemplary embodiment described above, the base station to which the terminal 13 connects is described to be one, but the 3GPP specifications include a specification called control/user (C/U) separation in which a frequency band for processing control plane data and a frequency for processing user plane data are separate. The present exemplary embodiment is also applicable to this C/U separation system. Specifically, there may be adopted a configuration in which the processing in FIG. 4 is applied to a base station using the frequency band for processing the user plane data, and the frequency band for processing the control plane data exists separately from this frequency band.

Furthermore, in the exemplary embodiment described above, the frequency and RSSI for each neighboring base station ID reported by the terminal 13 are adopted as the radio-frequency-interference-related information, but the radio-frequency-interference-related information is not limited to the frequency and RSSI. For example, the radio-frequency-interference-related information may be a connection history of the terminal 13. In this case, if an instantaneous interruption or breakdown occurs at a predetermined rate in the connection history, the terminal 13 can report the instantaneous interruption or breakdown of wireless communication to the communication control apparatus 11. Further, the communication control apparatus 11 may determine the presence or absence of radio frequency interference based on the number of times an instantaneous interruption or breakdown of wireless communication occurs, and decide the frequency band.

In the first exemplary embodiment, the configuration in which the terminal reports the radio-frequency-interference-related information is described. In a second exemplary embodiment below, a configuration in which a base station reports radio-frequency-interference-related information will be described. The hardware configuration of a communication control apparatus 11 according to the present exemplary embodiment can be similar to the configuration in FIG. 2, and the communication control apparatus 11 can have a functional configuration similar to the configuration in FIG. 3.

FIG. 8 is a flowchart illustrating licensed band operation processing according to the second exemplary embodiment. In the following description, the same contents as those in the flowchart in FIG. 4 will be denoted by the same symbols as those in FIG. 4, and the description thereof will be omitted.

In FIG. 8, if a local 5G communication network is not currently operated using a licensed band (NO in step S41), an operation frequency band management unit 37 performs the same processing as the processing in FIG. 4.

If the local 5G communication network is currently operated using the licensed band (YES in step S41), the processing proceeds to step S81. In step S81, a radio-frequency-interference-related information acquisition unit 38 acquires a list of communication error rates of base stations of the licensed band currently used in the operation, from the base station.

Next, in step S82, the operation frequency band management unit 37 determines whether a base station having a communication error rate of 10% or more is present. The communication error rate used as a threshold for the determination in step S82 is not necessarily limited to 10% and a value most suitable for the local 5G communication network to be operated may be adopted.

If a base station having a communication error rate of 10% or more is not present (NO in step S82), the processing ends, and the operation frequency band management unit 37 continues the operation using the licensed band.

If a base station having a communication error rate of 10% or more is present (YES in step S82), the processing proceeds to step S83. In step S83, the operation frequency band management unit 37 determines whether the current time is in a period from 8:00 to 17:00 on a weekday. The operation frequency band management unit 37 may skip step S83, or may perform this determination at any date and time set by a network administrator.

If the current time is not in a period from 8:00 to 17:00 on a weekday (NO in step S83), the processing ends, and the operation frequency band management unit 37 continues the operation using the licensed band.

If the current time is in a period from 8:00 to 17:00 on a weekday (YES in step S83), the processing proceeds to step S46. In step S46, the operation frequency band management unit 37 changes the operation from the licensed band to an unlicensed band. The operation can be thereby changed from the licensed band to the unlicensed band in a case where the error rate is 10% or more, which is high, during weekday business hours, so that it is possible to increase business efficiency during weekday business hours, while suppressing an increase in delay time outside of weekday business hours.

Next, in step S84, the operation frequency band management unit 37 changes a base station setting value, and the processing ends. This base station setting value is a handover threshold included in transmission power of a base station or a notification signal of the base station. The operation frequency band management unit 37 may optimize the base station setting value, based on information such as a communication frequency of a base station adjacent to a base station for which the value is to be changed.

Further, the operation frequency band management unit 37 may correct the base station setting value to a more appropriate value by executing the processing in FIG. 8 again, after changing the base station setting value.

As described above, according to the second exemplary embodiment, the operation frequency band management unit 37 can acquire the radio-frequency-interference-related information also from the base station, so that the determination accuracy can be improved. Further, because the operation frequency band management unit 37 can change the base station setting value in response to the change of the frequency band, the network configuration can be optimized.

The report of the radio-frequency-interference-related information is not limited to the report only from the terminal or only from the base station, and the operation frequency band management unit 37 may determine the presence or absence of the radio-frequency-interference-related information, using both of the report from the terminal and the report from the base station.

Further, the operation frequency band management unit 37 may change the frequency band, only for a base station determined to have radio frequency interference.

Furthermore, in a case where the processing in FIG. 4 is a first mode and the processing in FIG. 8 is a second mode, the same apparatus may execute the first mode and the second mode. In this case, either the first mode or the second mode may be selected to be executed, based on an instruction from a user or an instruction from an application.

In the first exemplary embodiment and the second exemplary embodiment, the configuration in which the operation frequency band is automatically changed is described. In a third exemplary embodiment below, a configuration in which an operation frequency band is changed after being confirmed by a network administrator will be described. The hardware configuration of a communication control apparatus 11 according to the present exemplary embodiment can be similar to the configuration in FIG. 2, and the communication control apparatus 11 can have a functional configuration similar to the configuration in FIG. 3.

FIG. 9 is a flowchart illustrating licensed band operation processing according to the third exemplary embodiment. In the following description, the same contents as those in the flowchart in FIG. 8 will be denoted by the same symbols as those in FIG. 8, and the description thereof will be omitted.

In FIG. 9, if a local 5G communication network is not currently operated using a licensed band (NO in step S41), an operation frequency band management unit 37 performs the same processing as the processing in FIG. 8. If the local 5G communication network is currently operated using the licensed band (YES in step S41), the operation frequency band management unit 37 performs the same processing as the processing up to step S82 in FIG. 8.

If a base station having a communication error rate of 10% or more is present (YES in step S82), the processing proceeds to step S91. In step S91, a control unit 22 notifies the administrator of the error rate, via an output unit 25.

Next, in step S92, an input unit 26 determines whether an input from the administrator is present.

If no input from the administrator is present (NO in step S92), the input unit 26 waits until an input is provided by the administrator. If an input from the administrator is present (YES in step S92), the processing proceeds to step S93. In step S93, the operation frequency band management unit 37 determines whether the input from the administrator is an instruction to change the operation to an unlicensed band.

If the input from the administrator is not an instruction to change the operation to the unlicensed band (NO in step S93), the processing ends, and the operation frequency band management unit 37 continues the operation using the licensed band. If the input from the administrator is an instruction to change the operation to the unlicensed band (YES in step S93), the processing proceeds to step S46. In step S46, the operation frequency band management unit 37 changes the operation from the licensed band to the unlicensed band.

As described above, according to the third exemplary embodiment, the operation frequency band can be changed after being confirmed by the network administrator, so that the operation frequency band can be managed depending on a situation of the administrator or the like.

Other Exemplary Embodiments

In the exemplary embodiments described above, for example, as illustrated in FIG. 4, the presence or absence of the unknown base station is determined, whether the frequency of the connected base station and the frequency of the unknown base station match each other is determined, and the RSSI of the connected base station and the RSSI of the unknown base station are compared, in order to determine which one of the unlicensed band and the licensed band is to be selected as the frequency band to be used in the operation. In various embodiments of the present disclosure, such rule-based determination may be performed, but machine-learning-based determination may be adopted. For example, a neural network may be trained so that a determination result in selecting the unlicensed band or the licensed band is recognized as correct answer data, when given information such as the presence or absence of the unknown base station, the frequency of the connected base station, the frequency of the unknown base station, the RSSI of the connected base station, the RSSI of the unknown base station, and the communication error rate of the base station. Whether the unlicensed band or the licensed band is to be selected as the frequency band to be used in the operation may be determinable using this pre-trained model.

Other Embodiments

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-147637, filed Sep. 2, 2020, which is hereby incorporated by reference herein in its entirety.

What is claimed is:

1. A communication control apparatus configured to control a base station to which the communication control apparatus is connected, comprising:
    an acquisition unit configured to acquire radio-frequency-interference-related information related to radio frequency interference of a frequency band in a licensed band, based on an operation status of the frequency band in the licensed band; and
    a management unit configured to determine whether a frequency band used by the base station in operation is the licensed band to manage a frequency band to be used in operation, based on the radio-frequency-interference-related information acquired by the acquisition unit.

2. The communication control apparatus according to claim 1,
    wherein the acquisition unit acquires the radio-frequency-interference-related information related to the radio frequency interference of the frequency band in the licensed band, during operation using a frequency band in an unlicensed band, and
    wherein the management unit changes the frequency band being used in operation in the unlicensed band to the frequency band in the licensed band, based on the radio-frequency-interference-related information acquired by the acquisition unit.

3. The communication control apparatus according to claim 2, wherein the management unit
    determines an interference state of interference between the frequency band being used in operation in the unlicensed band and the frequency band in the licensed band, based on the radio-frequency-interference-related information acquired by the acquisition unit, and changes the frequency band being used in operation in the unlicensed band to the frequency band in the licensed band, based on a result of determining the interference state.

4. The communication control apparatus according to claim 1,
wherein the acquisition unit acquires the radio-frequency-interference-related information related to the radio frequency interference of the frequency band in the licensed band, during operation using the frequency band in the licensed band, and
wherein the management unit changes the frequency band being used in operation in the licensed band to a frequency band in an unlicensed band, based on the radio-frequency-interference-related information acquired by the acquisition unit.

5. The communication control apparatus according to claim 4, wherein the management unit
determines an interference state of interference between the frequency band being used in operation in the licensed band and the frequency band in the licensed band, based on the radio-frequency-interference-related information acquired by the acquisition unit, and
changes the frequency band being used in operation in the licensed band to the frequency band in the unlicensed band, based on a result of determining the interference state.

6. The communication control apparatus according to claim 1, wherein the acquisition unit acquires the radio-frequency-interference-related information from a terminal or a base station in a local 5th Generation (5G) communication network.

7. The communication control apparatus according to claim 1,
wherein the acquisition unit acquires radio-frequency-interference-related information of a frequency band of user plane data to which a frequency band different from a frequency band of control plane data is allocated, and
wherein the management unit manages a frequency band to be used in operation of the user plane data, based on the radio-frequency-interference-related information acquired by the acquisition unit.

8. The communication control apparatus according to claim 1,
wherein the radio-frequency-interference-related information includes a communication frequency, a received signal strength indicator, and a base station identification (ID) of a connected base station, and a communication frequency, a received signal strength indicator, and a base station ID of an adjacent base station adjacent to the connected base station, and
wherein the management unit changes a frequency band in a licensed band being used in operation in the connected base station to a frequency band in an unlicensed band, in a case where an unknown base station not included in an own network is present as the adjacent base station, and the communication frequency of the unknown base station and the communication frequency of the connected base station match each other, and a difference between the received signal strength indicator of the unknown base station and the received signal strength indicator of the connected base station is less than or equal to a predetermined value.

9. The communication control apparatus according to claim 1,
wherein the radio-frequency-interference-related information is a connection history of a local 5G terminal, and
wherein the management unit changes the frequency band being used in operation in the licensed band to a frequency band in an unlicensed band, in a case where an instantaneous interruption or a breakdown occurs at a predetermined rate in the connection history.

10. The communication control apparatus according to claim 1, wherein the management unit changes the frequency band being used in operation in the licensed band to a frequency band in an unlicensed band, at a preset date and time.

11. The communication control apparatus according to claim 1, wherein the management unit changes the frequency band being used in operation in the licensed band to a frequency band in an unlicensed band, for a base station in an area where the radio frequency interference occurs.

12. The communication control apparatus according to claim 1, wherein the management unit changes a base station setting value in a local 5G communication network, based on the frequency band to be used in operation.

13. The communication control apparatus according to claim 12, wherein the base station setting value is a handover threshold included in transmission power of a base station or a notification signal of the base station in the local 5G communication network.

14. The communication control apparatus according to claim 12, wherein the management unit changes a base station setting value of a first base station, based on base station information of a second base station adjacent to the first base station in the local 5G communication network.

15. The communication control apparatus according to claim 14, wherein the base station information is a communication frequency of the second base station.

16. The communication control apparatus according to claim 12, wherein the management unit corrects the base station setting value, based on the radio-frequency-interference-related information, after changing the base station setting value.

17. The communication control apparatus according to claim 1, further comprising a notification unit configured to notify that the frequency band being used in operation in the licensed band is to be changed to a frequency band in an unlicensed band.

18. The communication control apparatus according to claim 1, further comprising an input unit configured to receive an input of an instruction to change a frequency band being used in operation,
wherein the management unit determines whether to change the frequency band being used in operation in the licensed band to a frequency band in an unlicensed band, based on the input to the input unit.

19. A communication control method for a communication control apparatus configured to control a base station to which the communication control apparatus is connected, the method comprising:
acquiring radio-frequency-interference-related information related to radio frequency interference of a frequency band in a licensed band, based on an operation status of the frequency band in the licensed band; and
determining whether a frequency band used by the base station in operation is the licensed band to manage a frequency band to be used in operation, based on the acquired radio-frequency-interference-related information.

20. A non-transitory computer-readable storage medium storing a program for causing a computer to operate as a communication control apparatus performing a process, the communication control apparatus configured to control a base station to which the communication control apparatus is connected, and the process comprising:
   acquiring radio-frequency-interference-related information related to radio frequency interference of a frequency band in a licensed band, based on an operation status of the frequency band in the licensed band; and
   determining whether a frequency band used by the base station in operation is the licensed band to manage a frequency band to be used in operation, based on the acquired radio-frequency-interference-related information.

* * * * *